United States Patent [19]

Tomalin

[11] Patent Number: 4,988,552
[45] Date of Patent: Jan. 29, 1991

[54] ELECTRICAL DISCHARGE MACHINING ELECTRODE

[75] Inventor: Dandridge S. Tomalin, Chagrin Falls, Ohio

[73] Assignee: Composite Concepts Company, Twinsburg, Ohio

[21] Appl. No.: 208,146

[22] Filed: Jun. 17, 1988

[51] Int. Cl.⁵ .................... B23H 1/06; B23K 35/22
[52] U.S. Cl. .................. 428/677; 219/69.12; 219/69.15
[58] Field of Search ............ 428/607, 677, 658, 675; 219/69 W, 69.12, 69.15; 174/126 CP

[56] References Cited

U.S. PATENT DOCUMENTS

| | | | |
|---|---|---|---|
| 2,317,350 | 4/1943 | Adler et al. | 204/35 |
| 2,378,458 | 6/1945 | Avallone | 205/458 |
| 2,392,456 | 1/1946 | Brown et al. | 204/37 |
| 2,904,717 | 9/1959 | Kerstetter | 313/355 |
| 2,918,722 | 12/1959 | Kenmore | 428/677 |
| 3,008,201 | 11/1961 | Carreker, Jr. | 22/57.2 |
| 3,060,053 | 10/1962 | Carreker, Jr. et al. | 11/405 |
| 3,714,701 | 2/1973 | Dion et al. | 29/474.1 |
| 4,227,061 | 10/1980 | Westfall et al. | 219/9.5 |
| 4,287,404 | 9/1981 | Convers et al. | 219/69 W |
| 4,304,113 | 12/1981 | Takei et al. | 72/39 |
| 4,341,939 | 7/1982 | Briffod et al. | 219/69 W |
| 4,424,432 | 1/1984 | Kaneko et al. | 219/69 W |
| 4,686,153 | 8/1987 | Tominaga et al. | 428/677 |
| 4,740,666 | 4/1988 | Tomalin et al. | 428/677 |

FOREIGN PATENT DOCUMENTS

| | | |
|---|---|---|
| 623087 | 7/1961 | Canada . |
| 701901 | 1/1965 | Canada . |
| 714011 | 7/1965 | Canada . |
| 793785 | 9/1968 | Canada . |
| 155127 | 9/1983 | Canada . |
| 53-22930 | 7/1978 | Japan .................. 219/146.1 |
| 117021 | 6/1986 | Japan .................. 219/69 W |
| 136733 | 6/1986 | Japan .................. 219/69 W |
| 136734 | 6/1986 | Japan .................. 219/69 W |
| 252025 | 11/1986 | Japan .................. 219/69 W |
| 284321 | 12/1986 | Japan .................. 219/69 W |
| 284322 | 12/1986 | Japan .................. 219/69 W |
| 645831 | 10/1989 | Switzerland ........... 219/69 W |

OTHER PUBLICATIONS

Publication by GE entitled BlackSabre.

*Primary Examiner*—John J. Zimmerman
*Attorney, Agent, or Firm*—Watts, Hoffmann, Fisher & Heinke Co.

[57] ABSTRACT

A wire electrode for a traveling wire EDM apparatus that comprises a copper clad steel core that is clad with a homogenous, outer brass layer using a classical bonding process. The copper clad steel core has a conductivity in the range of 50%-70% IACS (International Annealed Copper Standard) and the brass layer comprises 35%-50% by volume of the electrode. The brass layer comprises 65% copper and 35% zinc in an optimum construction. For a wire electrode having an overall diameter of 0.010 inches, the outer homogenous, brass layer is substantially 25 microns thick when the brass comprises 35% by volume of the wire and the copper clad steel core has a conductivity of 60% IACS and is contructed from AISI 10006 steel wire.

9 Claims, 2 Drawing Sheets

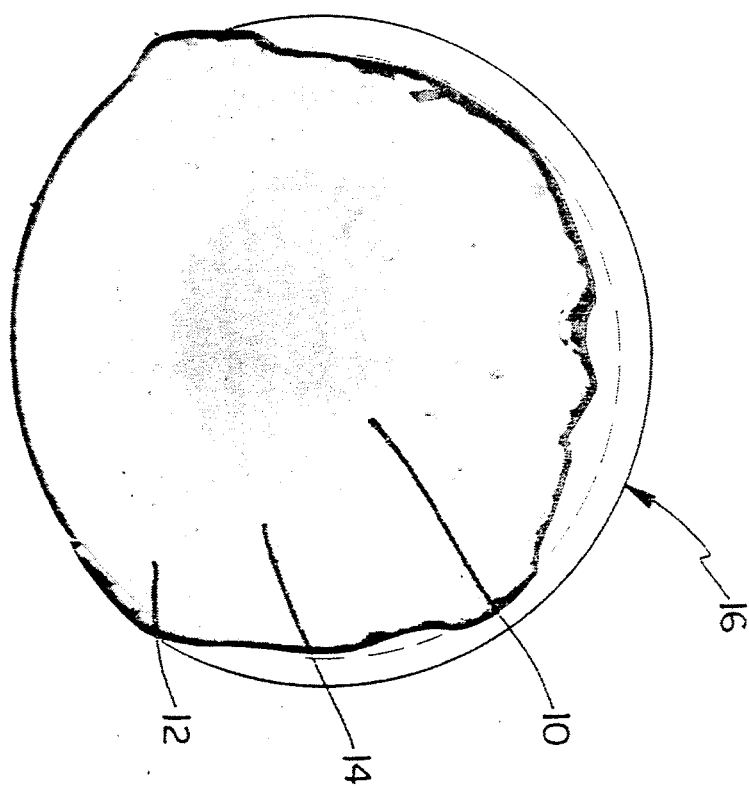

ELECTRICAL DISCHARGE MACHINING ELECTRODE

TECHNICAL FIELD

The present invention relates generally to electrical discharge machining (EDM) and in particular to an improved electrode which improves the overall cutting rate and cutting performance in an EDM apparatus.

BACKGROUND ART

U.S. Pat. No. 4,287,404 illustrates a typical EDM apparatus as well as an electrode suitable for use in an EDM process. In its simplest terms, the EDM process uses an electrode that is brought into close proximity to a work piece. An electrical potential is applied between the electrode and the work piece at a level sufficient to cause an electrical discharge which causes erosion of both the electrode and the work piece.

One type of commercial EDM equipment uses a travelling wire electrode so that fresh electrode material is always present thus enabling a constant cutting action. In this travelling wire EDM process, a traveling wire moves past the material to be cut and a pulsed potential is applied between the wire electrode and the workpiece. A spark is generated, the heat of which melts a small volume of the workpiece (and electrode). A dielectric, usually deionized water is used to flush the cutting region and removes the eroded material. This process, spark...melt...flush, is repeated thousands of times per second.

The efficiency at which the cutting action takes place is in large measure dependent on the construction and material properties of the wire electrode. The electrode must be capable of sustaining high current densities and therefore must be electrically conductive and must also have relatively high mechanical strength since it must be kept under tension as it moves past the workpiece in order for the cutting action to maintain precise tolerances.

In general, wire materials that have high mechanical strength are generally poor conductors of electrical current. For this reason, various hybrid or composite wires have been suggested in the past. In the case of U.S. Pat. No. 4,287,404, referenced above, an electrode was disclosed that included an outer coating of either zinc, cadmium, tin, lead, antimony or bismuth, or allies thereof plated onto various metallic substrates including a copper clad steel core.

In U.S. Pat. No. 4,686,153 a composite electrode was disclosed which included a copper clad steel wire that was plated with zinc using an electroplating or hot galvanizing process. Following the plating process, the wire was heated in order to disperse copper into the zinc layer to form a gradient layer in which the concentration of zinc decreased in the radial direction as the center of the electrode was approached. It is believed that the wire disclosed in this patent is very expensive and as a result was not economically feasible. In addition, it is believed that a zinc gradient in which the zinc concentration decreases as one moves radially inwardly from the outer surface, results in a wire construction that is not efficient and may perform erratically since the concentration of zinc (which improves the flushability) varies and in fact is reduced as the center of the wire is approached during erosion.

DISCLOSURE OF INVENTION

The present invention provides a new and improved electrode wire for an EDM process. The disclosed wire has substantially high mechanical strength (as compared to a pure brass wire) and is capable of being used at relatively high cutting speeds while maintaining cutting accuracy. The disclosed wire electrode resists breaking during use while having the desirable EDM properties of high conductivity and good flushability usually only found in more expensive hybrid wires.

According to the invention, the wire electrode is formed in a dual cladding process. Preferably, the core material comprises copper clad steel having a conductivity of 50% IACS (International Annealed Copper Standard) or more. Preferably, the conductivity is in the range of 60% IACS.

The core wire is then clad with a brass alloy preferably comprising 65% copper and 35% zinc, by weight using a classical bonding process. The process for cladding the core wire with brass is preferably one such as that disclosed in U.S. Pat. No. 4,227,061 and/or U.S. Pat. No. 3,714,701 which are both hereby incorporated by reference.

With the disclosed method for producing the wire electrode, an outer, homogenous copper/zinc layer is formed which, unlike the electrode wire disclosed in U.S. Pat. No. 4,686,153, has zinc uniformly dispersed throughout the layer. As a consequence, as the electrode surface erodes, the discharge characteristics do not change due to a decrease in zinc concentration. With the disclosed wire, flushability remains essentially constant as the outer layer erodes.

In addition, with the disclosed process for manufacturing the electrode wire, an outer layer thickness substantially greater than 15 microns (for a wire diameter of 0.010 inches ) is easily and economically achievable. It has been found that for wire sizes in the range of 0.010 inches, an outer layer thickness in the range of 25-30 microns is highly desirable.

With the present invention, an electrode wire for an EDM process having the strength and cutting advantages of both a pure brass wire and a zinc coated steel core wire is obtainable at relatively low cost.

Additional features of the invention will become apparent and a fuller understanding obtained by reading the following detailed description made in connection with the accompanying drawing.

BEST MODE FOR CARRYING OUT INVENTION

Figure 1:
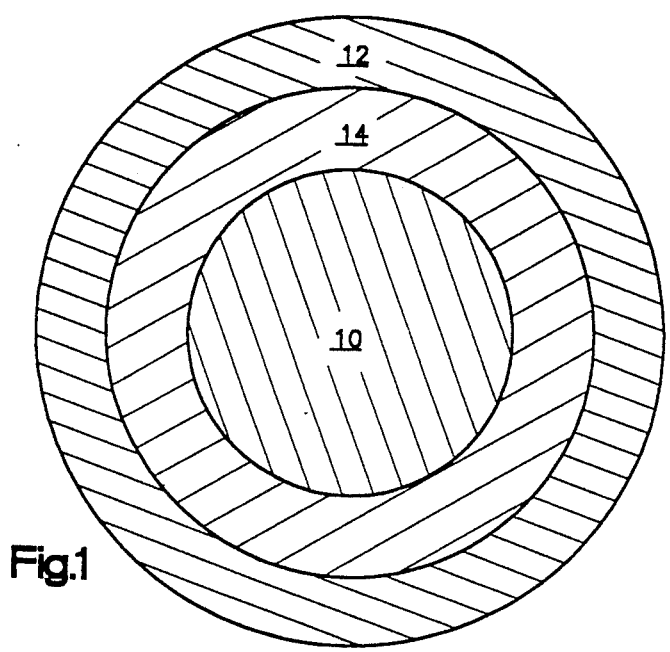
FIG. 1 is a cross sectional view of a wire electrode for use in an EDM process, constructed in accordance with the preferred embodiment of the invention; and, FIG. 2 is a photomicrograph of a cross section of an electrode wire embodying the present invention showing the electrode after use in an EDM process.

FIG. 1 illustrates the details of an EDM wire electrode constructed in accordance with the preferred embodiment of the invention. The wire comprises a steel core 10, an outer, homogenous brass layer 12 and an intermediate, homogenous copper layer 14. Unlike the prior art, both the copper and brass layers 12, 14 are clad in a classical bonding process such as that disclosed in U.S. Pat. No. 3,714,701 and U.S. Pat. No. 4,227,061 for bimetallic constructions only. In the cladding processes disclosed in the above identified patents, a metal sheath such as copper is roll bonded to a dissimilar metal core such as steel using pressure and heat. The cladding material comprises one or more strips, the total width of the strips being sufficient to enclose the core rod. After the bonding step is completed, the wire is drawn to a final desired diameter. The final thickness of the clad layer is determined by the thickness of the strip or strips and the extent to which the wire is drawn.

In accordance with the preferred process, a steel core preferably comprising a low carbon AISI 1006 steel wire is clad with copper using the bonding technique disclosed in either of the two above identified patents. If higher tensile strength should be desired, steel cores up to type AISI 1050 may be employed. Following the first cladding step, the copper clad steel core is then clad in a similar bonding process with a brass layer, the brass preferably comprising approximately 65% copper and 35% zinc by weight. The resulting dual clad wire is then drawn to a final diameter that is suitable for EDM applications i.e. in the range of 0.010 inches. For actual applications, the diameter of the wire may range from 0.005 to 0.020 inches.

For optimum performance, the copper clad steel core should have a conductivity of at least 50% IACS (International Annealed Copper Standard). Unlike the prior art, the outer brass layer is homogenous and for a 0.010 inch wire, has a thickness substantially greater than the maximum 15 micron copper/zinc layer taught by U.S. Pat. No. 4,686,153. The inventor has found, contrary to the teachings of this patent, that a homogenous brass layer greater than 15 microns is preferable because it provides improved cutting speed, cutting accuracy and flushability without sacrificing the mechanical strength of the cutting wire. It is believed, that the zinc in the brass layer must be uniformly dispersed throughout the layer as opposed to dispersed in a gradient fashion as taught in the '153 patent. With the disclosed dual cladding process, the resulting EDM wire is found to perform substantially better than pure brass EDM wires as well as zinc plated, copper clad wires such as disclosed in the '153 patent.

Table I presents critical parameters for three differently sized EDM wires and for 50%, 60% and 70% IACS copper clad steel cores. For example, the first line of the table indicates that an 8 mil wire having a homogenous brass outer layer that comprises 35% by volume of the overall composite wire, should have a brass thickness of 0.78 mils which equates to 19.69 microns. The overall conductivity of the composite wire will be 48.1% IACS when using a 60% IACS copper clad steel core and 41.7% when using a 50% copper clad steel core. As can be seen from the table, the minimum thickness of a homogenous brass layer 14 for an 8 mil wire is substantially 20 microns which as noted above is substantially greater than the maximum copper/zinc layer (15 microns) taught by U.S. Pat. No. 4,686,153. For optimum performance, the brass layer should represent 35–50% by volume of the overall wire with 40% being preferred. A brass thickness in the range of 25–40 microns is preferred to promote adequate flushability.

TABLE I

| Vol % BRASS | D (mils) | t (mils) | t (micron) | % IACS OF COMPOSITE WITH COPPER CLAD STEEL CORE % IACS EQUAL TO | | |
|---|---|---|---|---|---|---|
| | | | | 70% | 60% | 50% |
| 0.350 | 8 | 0.78 | 19.69 | 54.6 | 48.1 | 41.7 |
| 0.400 | 8 | 0.90 | 22.90 | 52.4 | 46.4 | 40.4 |
| 0.450 | 8 | 1.03 | 26.25 | 50.2 | 44.7 | 39.2 |
| 0.500 | 8 | 1.17 | 29.76 | 48.1 | 43.1 | 38.0 |
| 0.350 | 10 | 0.97 | 24.61 | 54.6 | 48.1 | 41.7 |
| 0.400 | 10 | 1.13 | 28.63 | 52.4 | 46.4 | 40.4 |
| 0.450 | 10 | 1.29 | 32.81 | 50.2 | 44.7 | 39.2 |
| 0.500 | 10 | 1.46 | 37.20 | 48.1 | 43.1 | 38.0 |
| 0.350 | 12 | 1.16 | 29.53 | 54.6 | 48.1 | 41.7 |
| 0.400 | 12 | 1.35 | 34.35 | 52.4 | 46.4 | 40.4 |
| 0.450 | 12 | 1.55 | 39.38 | 50.2 | 44.7 | 39.2 |
| 0.500 | 12 | 1.76 | 44.64 | 48.1 | 43.1 | 38.0 |

The above table assumes a copper resistivity equal to 1.67 micro ohms/cm., a steel resistivity equal to 9.71 micro ohms/cm and a brass resistivity equal to 6.40 micro ohms/cm; 1 mil is equal to 0.001 inches The brass layer preferably comprises 60% copper and 35% zinc by weight This is commonly termed yellow brass. However it is believed that brass having a zinc content as high as 39% by weight can be utilized. The copper clad steel core may have a conductivity in the range of 50%–70% IACS, with 60% being preferred FIG. 2 is a micrograph of a cross section of an 0.010 inch wire electrode constructed in accordance with a preferred embodiment of the invention, after use in an EDM apparatus. The solid circle 16 indicates the original diameter of the electrode whereas the dashed circle indicates where the brass layer would end if it were only 15 microns thick as taught by U.S. Pat. No. 4,686,153. As seen in the micrograph, the erosion of the outer brass layer was substantially greater than 15 microns. In some regions of the wire, even portions of the copper layer were eroded. It is clear from this micrograph that an outer brass layer having a thickness substantially greater than 15 microns is desirable.

The wire electrode shown in FIG. 2 was constructed with a 60% IACS copper clad steel core that was in turn clad with a brass layer that comprised 40% by volume of the total wire, yielding a brass layer of substantially 29 microns (see Table I). The wire was used to cut 1.125 inch thick D2 tool steel at a feed rate of 0.290 inches/min. The gap current was 11 amps and the gap voltage was 55 volts.

Experiments were run comparing the performance of a wire electrode embodying the present invention with brass electrode wires commercially available from three different manufacturers. The wires were used to cut a 2 inch D2 tool steel workpiece. The wire of the present invention was able to sustain a cutting speed of 0.142 inches/min. The commercially available brass wires were able to achieve speeds of only 0.120 inches/min., 0.130 inches/min. and 0.120 inches/min. under the same cutting conditions.

Although the invention has been described with a certain degree of particularity, it should be understood that those skilled in the art can make various changes to it without departing from the spirit or the scope of the invention as hereinafter claimed.

I claim:

1. A wire electrode for an EDM process, comprising:
   (a) a copper clad steel core having a conductivity of at least 50% IACS;

(b) a homogenous copper/zinc alloy outer layer bonded to said core wire by a mechanical cladding process using pressure and heat whereby a metallurgical bond is effected between said core wire and said outer layer, said outer layer comprising substantially 35%-50% (by volume) of the overall electrode.

2. The wire of claim 1 wherein said copper/zinc outer layer comprises 65% copper and 35% zinc by weight.

3. The wire of claim 1 wherein copper forming a portion of said core comprises substantially 35% by volume of the overall electrode.

4. A wire electrode for an EDM process, comprising:
(a) a copper clad steel core including a low carbon AISI 1006 steel core wire and a copper clad layer of sufficient thickness to provide a conductivity of 50%-70% IACS;
(b) a homogeneous brass outer layer bonded to said core wire by a mechanical bonding process using pressure and heat whereby a metallurgical bond is effected between said core wire and said brass outer layer, said outer layer comprising 35%-50% (by volume) of the overall electrode.

5. The wire electrode of claim 4 wherein the overall diameter of the electrode is 0.010 inches and the thickness of said brass layer is substantially greater than 15 microns.

6. The wire electrode of claim 4 wherein the overall diameter of the electrode is 0.010 inches and the thickness of said brass layer is in the range of 25-30 microns.

7. The wire electrode of claim 4 wherein said brass layer comprises 65% copper and 35% zinc by weight.

8. The wire electrode of claim 4 wherein said brass layer comprises substantially 40% by volume of the overall wire.

9. The wire electrode of claim 4, wherein said mechanical bonding process comprises a roll bonding process.

* * * * *